United States Patent
Shaw

(10) Patent No.: US 7,242,285 B2
(45) Date of Patent: Jul. 10, 2007

(54) APPARATUS AND METHOD FOR POWER MANAGEMENT IN A TIRE PRESSURE MONITORING SYSTEM

(75) Inventor: Mark Layne Shaw, Casa Grande, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 196 days.

(21) Appl. No.: 10/533,271

(22) PCT Filed: Feb. 12, 2003

(86) PCT No.: PCT/US03/07219

§ 371 (c)(1),
(2), (4) Date: Apr. 28, 2005

(87) PCT Pub. No.: WO2004/037566

PCT Pub. Date: May 6, 2004

(65) Prior Publication Data
US 2006/0082451 A1    Apr. 20, 2006

(51) Int. Cl.
*B60Q 1/00* (2006.01)
(52) U.S. Cl. .............. 340/449; 340/442; 73/146.5; 116/34 R
(58) Field of Classification Search ........ 340/442, 340/445, 446, 447, 448, 443, 444, 449, 539.1; 73/146.5, 146.4; 116/34 R, 34 B; 152/152.1; 200/61.22
See application file for complete search history.

(56) References Cited

U.S. PATENT DOCUMENTS

| | | | | |
|---|---|---|---|---|
| 5,297,424 | A * | 3/1994 | Sackett | 73/146.5 |
| 5,886,624 | A * | 3/1999 | Hebert | 340/442 |
| 6,278,363 | B1 | 8/2001 | Bezek | |
| 6,369,712 | B2 * | 4/2002 | Letkomiller et al. | 340/572.1 |
| 6,507,276 | B1 | 1/2003 | Young | |
| 6,535,116 | B1 | 3/2003 | Zhou | |
| 6,809,637 | B1 * | 10/2004 | Brown | 340/443 |

* cited by examiner

Primary Examiner—Anh V. La
(74) Attorney, Agent, or Firm—Robert L. King

(57) ABSTRACT

A system (10) and method manages battery (13) power in a wheel module (11) for indicating when air pressure in a tire falls below a recommended value. Tire air pressure is sensed with a pressure sensor (16). Tire air temperature is sensed with a temperature sensor (18). A determination is made whether the air pressure is increasing or decreasing with respect to time. Based upon whether a ratio of the air pressure and the air temperature is increasing, decreasing or remaining constant with respect to time, tire motion is inferred without directly sensing acceleration or movement of the tire. Power management circuitry (14) controls battery power to enable sensing of air pressure and air temperature at measurement intervals that are longer in time when the tire is not in motion.

20 Claims, 4 Drawing Sheets

| PRESSURE | PRESSURE/TEMPERATURE RATIO | TIRE CONDITION | SYSTEM RESPONSE |
|---|---|---|---|
| DECREASING | DECREASES | AIR LEAK IN TIRE | AIR LEAK DETECTED; GO TO SHORTER MEASURE AND TRANSMIT INTERVALS. |
| | REMAINS CONSTANT | TIRE IS COOLING | VEHICLE IS PARKED; GO TO LONGER MEASURE AND TRANSMIT INTERVALS. |
| | INCREASES | NOT VALID CONDITION | INVALID CASE. DEFAULT TO SHORTER MEASURE AND TRANSMIT INTERVALS. |
| CONSTANT | DECREASES | NOT VALID CONDITION | INVALID CASE. KEEP CURRENT MEASURE AND TRANSMIT INTERVALS. |
| | REMAINS CONSTANT | TIRE IS STEADY STATE CONDITION | TIRE STABLE. KEEP CURRENT MEASURE AND TRANSMIT INTERVALS. |
| | INCREASES | NOT VALID CONDITION | INVALID CASE. KEEP CURRENT MEASURE AND TRANSMIT INTERVALS. |
| INCREASING | DECREASES | NOT VALID CONDITION | INVALID CASE. DEFAULT TO SHORTER MEASURE AND TRANSMIT INTERVALS. |
| | REMAINS CONSTANT | TIRE IS HEATING | VEHICLE IN MOTION; GO TO SHORTER MEASURE AND TRANSMIT INTERVALS. |
| | INCREASES | AIR IS BEING ADDED TO THE TIRE | AIR IS BEING ADDED; GO TO SHORTER MEASURE AND TRANSMIT INTERVALS. |

FIG. 2

APPARATUS AND METHOD FOR POWER MANAGEMENT IN A TIRE PRESSURE MONITORING SYSTEM

FIELD OF THE INVENTION

This invention relates to the detection of motion, and more particularly to a system and method for detecting movement of a vehicular pneumatic tire.

BACKGROUND OF THE INVENTION

Modern vehicular and automotive systems are increasingly using sensors to determine whether there is adequate air pressure in tires. Direct tire pressure monitoring using in-tire pressure sensors with a radio frequency (RF) data link are used to measure tire pressure. Presently used systems need a battery power source with a life requirement of many years. Power from the battery is consumed during pressure measurement, during RF transmission and from the overall standby current of the sensor module. In order to reduce the power demand, two general operational modes have been defined depending upon whether the vehicle is in motion or is parked. As a result, a mechanism to detect wheel movement is provided. The mechanism to detect wheel movement is typically implemented either with an electro-mechanical device that is sensitive to the angular acceleration of the wheel or with a micro electromechanical sensing (MEMS) accelerometer. For example, a motion switch is implemented within the tire and relies on the angular acceleration of the wheel pressing a mechanical mass against a contact. Problems to date with such devices have been associated with the fact that with repeated impacts and vibration the electrical connection loses reliability. Some are also subject to factures of the housing and the sensor adds to the cost of the tire. Additionally, an electro-mechanical switch requires power to operate as the switch will draw current when it is conductive.

Some motion switches may have a mass that is ferrous and therefore can be activated to a closed position using a strong magnet placed against the wheel. This allows the pressure sensor to transmit more frequently as a diagnostic. However, the level of diagnostic capability using a magnet is limited and any additional diagnostic functionality, such as a low sensitivity low frequency (LF) detector, adds to the system's battery load.

An indirect method of motion detection transmits a signal to a wheel module from the vehicle chassis telling the wheel module when the vehicle is in motion. This method is indirect because the wheel module within the tire itself does not measure vehicle speed in any way. The signal can be either an RF or an LF signal but the RF implementation typically uses more power and is more costly. In the LF indirect system, an LF oscillator, a driver and a transmit coil are located inside a wheel well. On the wheel module there is a sensitive amplifier to detect the signal picked up in a small receive coil. Alignment of transmit and receive coils is sensitive in order to get the maximum angle of wheel rotation where the signal is maximized. Also, the cost associated with a LF detection indirect system is high because of the additional circuitry on the chassis side for each wheel location, but information on each individual wheel may be obtained.

BRIEF DESCRIPTION OF THE DRAWINGS

The foregoing and further and more specific objects and advantages of the instant invention will become readily apparent to those skilled in the art from the following detailed description of the invention taken in conjunction with the following drawings:

FIG. 2 is a table of operational strategies associated with motion detection in the system of FIG. 1;

DETAILED DESCRIPTION OF THE INVENTION

Figure 1:
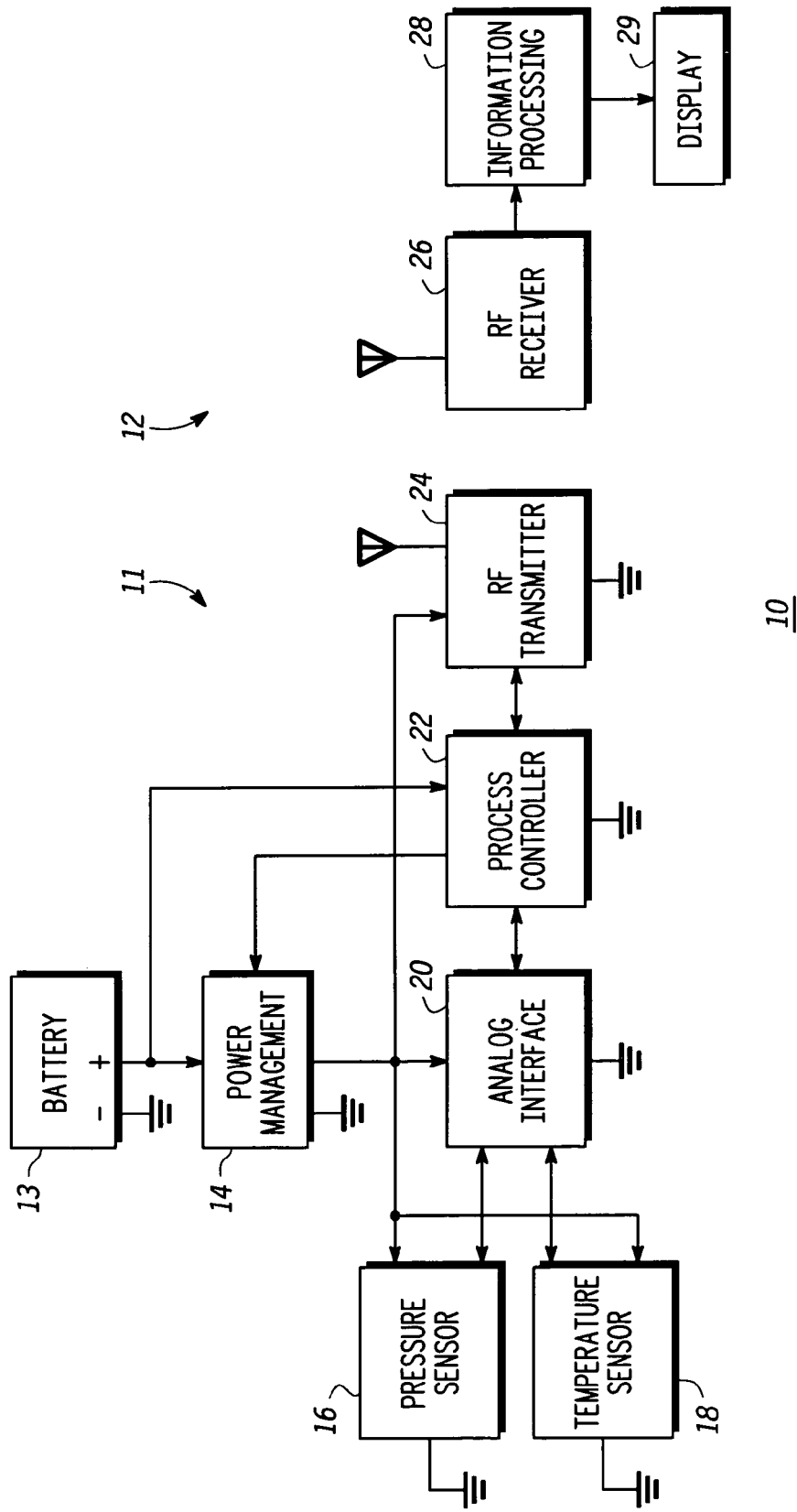
FIG. 1 is a block diagram of a tire pressure monitoring system having power management in accordance with the present invention.

Illustrated in FIG. 1 is a tire pressure monitoring system 10 generally having a wheel module 11 and a receiver portion 12 contained outside of a tire (not shown). Within wheel module 11 is a battery 13 that is connected to an input of a power management circuit 14. The positive battery output is connected to an input of a power management circuit 14. The negative battery output is connected to the common supply return of all the modules within the wheel module 11. For ease of illustration, the negative battery terminal is illustrated with each of the components in wheel module 11 being connected to an earth ground. The positive battery output is controlled by the power management circuit 14 to separately power inputs of a pressure sensor 16, a temperature sensor 18, an analog interface 20 and a radio frequency (RF) transmitter 24. The positive output of battery 13 is separately connected to a power input of a process controller 22. An input/output of pressure sensor 16 is connected to a first signal input/output of analog interface 20. An input/output of temperature sensor 18 is connected to a second signal input/output of analog interface 20. A third input/output of analog interface 20 is connected to an input/output of process controller 22. An input/output of process controller 22 is connected to an input/output of RF transmitter 24. RF transmitter 24 has an antenna for transmitting an RF signal that is received by an antenna of an RF receiver 26. Examples of frequencies used as the RF frequency are, by way of example only, from 300 MHz to 1 GHz. An output of RF receiver 26 is connected to an input of an information processing circuit 28. A display 29 is connected to an output of the information processing circuit 28.

In operation, the wheel module 11 is mounted within a vehicle's tire. Pressure sensor 16 functions to sense the tire's pressure when the pressure sensor 16 is powered. In one form, pressure sensor 16 is implemented as a micro-machined pressure sensor suitable for positioning within the tire. A known suitable sensor is fabricated in silicon with the physical sensing mechanism being either a variable resistance or capacitance. Similarly, when powered the temperature sensor 18 functions to sense the temperature of the air within the tire. The temperature measurement may be done using variable capacitance, variable resistance or a diode voltage. The analog interface 20 functions to perform an analog to digital conversion of the outputs of pressure sensor 16 and temperature sensor 18. Additionally, the analog interface 20 performs other functions such as providing clock synchronization and control signals to sensors 16 and 18, providing reference voltages and performing correction of sensor errors and nonlinearity errors associated with the pressure and temperature measurements. The processor controller 22 functions to gather pressure and temperature measurements at a given time interval and then send that data via the RF transmitter 24 at another time interval. In order to manage the battery power of battery 13 within wheel module 11 the process controller 22 selectively connects and disconnects battery 13 from the other components of wheel module 11 using the power management circuit 14. In addition to functioning as a matrix switch, power management circuit 14 may have other power saving logic and functionality incorporated therein to implement various low power modes and timing sense parameters. Additionally, process controller 22 contains logic circuitry or software code in a memory such as a ROM (not shown) for the purpose of identifying, based solely on the pressure and temperature of the tire, when the tire is in motion. In response to inferring whether tire motion exists, process controller 22 provides control over all battery power consumption as determined by the rate of measurement by the sensors 16 and 18 and the transmission rate of RF transmitter 24. Process controller 22 also monitors the tire pressure level indicated by pressure sensor 16 and provides a low pressure alarm signal to the RF transmitter 24 when the air pressure reaches or falls below a predetermined value. The low pressure alarm signal is received by RF receiver 26 and is processed by information processing circuitry 28 to signal to a user of the vehicle whether the tire pressure has fallen below or risen above a predetermined value. When information processing circuitry 28 detects that an air leak exists (i.e. that the pressure has fallen below a predetermined threshold), an alarm, either visual or audible, is sent to the display 29. Information processing circuitry 28 may be implemented as a microcontroller with programmable memory such as a ROM for storing software or as a state machine with hardware logic to implement the method taught herein.

Tire pressure monitoring system 10 uses an inferred method of motion detection to determine if motion may exist rather than implementing a motion sensing switch within the tire, thereby saving significant battery power. Within the wheel/tire assembly there is a known phenomenon that the tire will heat up as the vehicle is in motion. This phenomenon is the result of three main factors: work performed in flexing the tire tread and walls, heat received from the hub and brakes, and heat received from adjacent vehicle engine and exhaust. There are three main cooling effects: the air rushing over the tire, the road surface temperature and the presence of water and rain. Typical tires will increase about four to five percent in absolute value of the pressure and temperature after only a few kilometers of travel. The warm-up process is relatively predictable. However, the cool-down process is both longer and may include variations in the rate of pressure and temperature decrease due to the heat being transferred to the tire and wheel by the brakes and chassis.

It is possible to infer motion of the wheel solely by monitoring the changes in tire pressure and temperature. An increase in tire pressure is an indicator that tire motion is beginning and a decrease in tire pressure is an indicator that tire motion is ceasing. However, changes in tire pressure can also occur due to adding air to the tire and/or the tire developing a leak. But in the cases where air is added or subtracted from the tire, the mass of air has been altered.

According to the Ideal Gas Law there is a direct relationship between the mass, pressure, volume and temperature of an enclosed gas per the following equation:

$$(P)(V) = (n)(R)(T) \qquad \text{EQ. 1}$$

where:
P is absolute pressure (Pa)
T is temperature (degrees Kelvin)
V is volume of cavity (cubic meters)
n is the number of moles of the gas
R is the Universal Gas Constant (8.3145 J/mol ° K.)

Since the tire is a fixed volume or mass of gas, the equation can be rewritten as:

$$P/T = (n)(R)/V = (n)(k) \qquad \text{EQ. 2}$$

where:
k is a constant.

Therefore, the ratio of the pressure to the temperature (P/T) should remain a constant as long as there is no change in the mass of air within the tire. This relationship can be used to separate changes in tire pressure due to adding air or leaks from those changes caused by heating (motion) or cooling (parking) of the tire.

Illustrated in FIG. 2 is a table illustrating how tire motion may be inferred from the natural thermodynamic heating of the tires while in motion, thereby resulting in a change in tire pressure and tire temperature. In other words, motion per se is not sensed, but rather pressure and temperature changes are used by the process controller 22 to determine whether tire motion is occurring or has stopped. In the illustrated form, only tire air pressure and tire air temperature is required to be known. Assume that a most recent air pressure reading is less than a previous air pressure reading. The decrease will result in the pressure/temperature (P/T) ratio either decreasing or remaining constant. The pressure/temperature ratio cannot increase as that is not a valid condition according to the Ideal Gas Law. If the pressure/temperature ratio decreases in response to decreasing air pressure, the "mass" of the gas in the tire is decreasing and the tire condition is an air leak and process controller 22 implements a short measurement and RF transmission interval. If the pressure/temperature ratio remains constant while the pressure readings are decreasing, the tire condition is in a cooling situation as the tire air temperature is decreasing proportionately. The vehicle is assumed to be parked and process controller 22 implements a longer measurement and RF transmission interval. In the invalid case of the pressure/temperature ratio increasing, process controller 22 implements a default condition and forces a short measurement and RF transmission interval to gather new information to determine what is causing the air pressure to decrease and the pressure/temperature ratio to increase.

Assume that a most recent tire air pressure reading remains constant to the previous tire air pressure reading. The constant air pressure reading will result in the pressure/temperature ratio remaining constant as the ratio cannot increase or decrease according to the Ideal Gas Law. If the pressure/temperature ratio remains constant, the tire is assumed to be in a steady state condition and the current measure and transmit intervals are maintained. In a non-valid condition, the current measure and transmit intervals are also maintained.

Assume that a most recent tire air pressure reading is increased with respect to the previous tire air pressure reading. The increase will result in the pressure/temperature ratio increasing or remaining constant. The pressure/temperature ratio cannot decrease as that is not a valid condition according to the Ideal Gas Law. If the pressure/temperature ratio increases, the mass of the gas is increasing and the tire is having air added and process controller 22 implements a short measurement and RF transmission interval. If the pressure/temperature ratio remains constant while the pressure readings are increasing, the tire condition is in a heating situation as the tire air temperature is increasing proportionately. Because the mass of the gas is constant, the vehicle is assumed to be in motion and process controller 22 implements a shorter measurement and RF transmission interval. In the invalid case of the pressure/temperature ratio decreasing, process controller 22 implements a default condition and forces a short measurement and RF transmission interval to gather new information to determine what is causing the air pressure to increase and the pressure/temperature ratio to decrease. The above mentioned invalid conditions can appear to exist in real designs of the wheel module 11 due to differences in the time response of the pressure sensor 16 and the temperature sensor 18 to rapid variations in the tire temperature.

Overall this operation yields conditions of interest when the wheel module 11 should transition between measuring and transmitting slower or more frequently. These conditions can be simplified to the following criteria:

(1) if the pressure increases, start measuring and transmitting at shorter intervals;

(2) if the pressure decreases AND the pressure/temperature ratio is NOT constant, start measuring and transmitting at shorter intervals;

(3) if the pressure decreases AND the pressure/temperature ratio is constant then start measuring and transmitting at longer intervals;

(4) if the pressure is constant, maintain the current measurement and transmission intervals until one of the above three cases occurs; and (5) if faster than expected pressure drop can be determined by comparing a short-term average of the pressure readings with a much longer-term average of the pressure readings start measuring and transmitting at shorter intervals.

The other criteria factor is to define the time interval over which the pressure changes occur. Empirical data suggests that tire warm up caused by motion is characterized by a 10–20 kPa increase in pressure within approximately five minutes regardless of the vehicle speed profile. Tire cool down due to parking the vehicle results in a 10–20 kPa decrease in pressure within approximately forty-five minutes.

During the motion phase, the pressure measurements are fairly frequent and the receiver portion 12 will be able to notice any sudden change in pressure. However, during a parked vehicular condition, a sudden change in pressure may not be reported for some time. While this may not be a concern when the vehicle is actually parked, it can be a problem if the parked condition is incorrectly indicated while the vehicle is actually in motion. Such a situation can occur while driving if the tires are cooled by the vehicle entering water soaked roadways or encountering snow or rain. It is also desirable to have system 10 transmit more quickly to reset any prior low inflation warnings when the vehicle has been parked for a period of time and air has been added to the tires. Therefore, the longest measurement interval in either the parked or moving modes needs to be less than thirty seconds in order to capture sudden changes due to adding air or due to leaks that take place in much less time.

Figure 3:
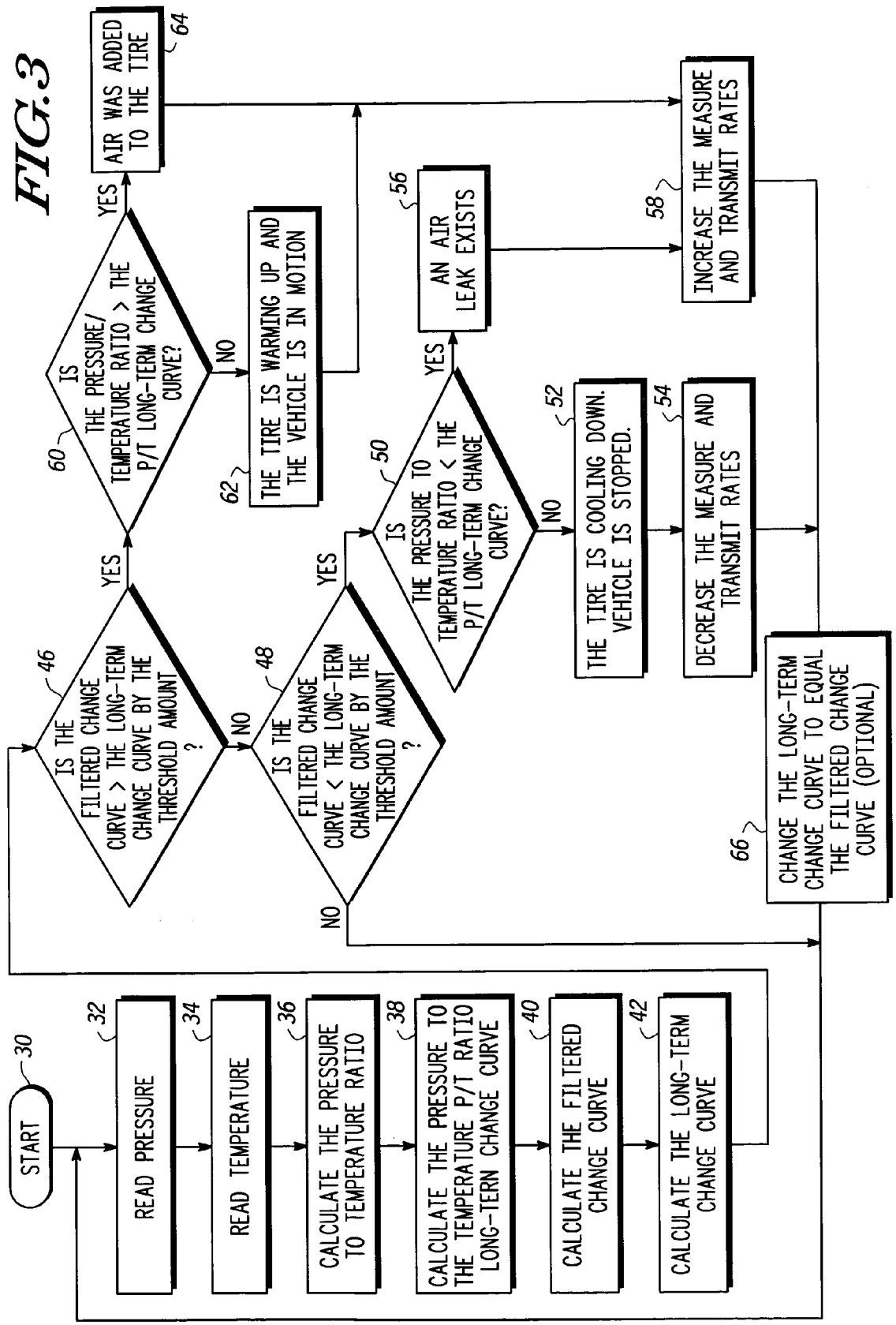
FIG. 3 is a method of motion detection in the system of FIG. 1.

Illustrated in FIG. 3 is a flowchart illustrating a method for thermodynamic motion detection of a pneumatic tire without using an internal electromechanical switch or signaling from an external device. The method of motion detection described herein permits system 10 to detect under-inflated tires in a timely manner as the motion detection can be performed as an air pressure change of more than 20 kPa from the long term average reading. The detection can be accomplished with conventional running average (RA) filters that add the newest reading to a percentage of all prior readings as:

$$P_{k+1} = [(N-1)(P_{k-1}) + P_k]/N \qquad \text{EQN. 3}$$

where:
$P_{k-1}$ is the prior average value
$P_k$ is the current pressure reading
$P_{k+1}$ is the new average value
N is the running average weight.

In general, a running average filter has a time constant that is equal to the value of N times the interval between samples. For example, for a value of N equal to eight and a sample time of thirty seconds, the time constant will be two hundred forty seconds. Using two running average filters, short term variations in pressure can be filtered out using a value of N equal to eight and long term variations can be filtered out using a value of N equal to one hundred twenty-eight. It should be understood that other methods to infer motion may be used. Any time variant method that makes a motion inference by using a long time period measurement and a shorter time period measurement may be used. Such time variant methods, for example, may use different averaging techniques or calculate differentials between time readings.

A tire/air system behaves much like an RC network in that the decay of pressure in response to a leak has a nearly exponential decrease in pressure. Much like the current flowing out of a capacitor is related to the decreasing voltage on the capacitor, a tire's air flow rate is related to the decreasing pressure head within the tire. Therefore, any given leak could be considered to have a simple exponential response with a characteristic time constant:

$$P = (P_0) e^{(-t/TC)} \qquad \text{EQN. 4}$$

where:
P is the current value of the pressure
$P_0$ is the initial starting pressure
t is the elapsed time
TC is the time constant.

The time constant (TC) is the value of time when the exponent is equal to unity and the value of the pressure has dropped 63.2% from its initial value.

As illustrated in FIG. 3, after a start 30, tire air pressure is read in a step 32. In a step 34, tire air temperature is read. With this information, the pressure to temperature (P/T) ratio is calculated in a step 36. Using previous P/T readings, a P/T ratio long term change curve is calculated in a step 38 as will be explained below. In a step 40, a filtered change curve is calculated as will be explained below. In a step 42, a long-term change curve is calculated as will be explained below. In a following decision step 46, a determination is made as to whether the filtered change curve is greater in value than the long-term change curve. If the determination is 'no', then a determination is made in a decision step 48 whether the filtered change curve is less than the long term change curve. If the determination is 'no', then the process begins again at step 32 and repeats the method by reading the pressure and temperature after either a long or short measure rate time expires and under control of process controller 22. If the determination in step 48 is 'yes', then a determination is made in a decision step 50 whether the pressure-to-temperature ratio is less than the P/T long term change curve. If the decision is 'no', it is determined in a step 52 that the tire is cooling and the vehicle has therefore stopped. Subsequent to step 52, the measure and transmit rates are decreased in a step 54. If the decision to step 50 is 'yes', then it is determined in a step 56 that an air leak exists. Subsequent to step 56, the measure and transmit rates are increased in a step 58. In response to each of steps 54 and 58, an optional step 66 is performed. In step 66, the value of the long-term change curve is modified to be equal to the current value of the filtered change curve. This modification, if implemented, provides sharper resolution for determination steps 46 and 48. Step 66 is followed by returning to the beginning of step 32 and repeating the method by reading the pressure and temperature after either a long or short measure rate time expires and under control of process controller 22. If the determination of step 46 is 'yes', a determination is made in decision step 60 whether the P/T ratio is greater than the P/T long-term change curve. If the decision in step 60 is 'yes', it is determined in a step 64 that air was added to the tire and that determination is followed by increasing the measure and transmit rates in step 58. If the decision in step 60 is 'no', it is determined in a step 62 that the tire is warming up and the vehicle has been in motion. Step 62 is followed by increasing the measure and transmit rates in step 58.

Figure 4:
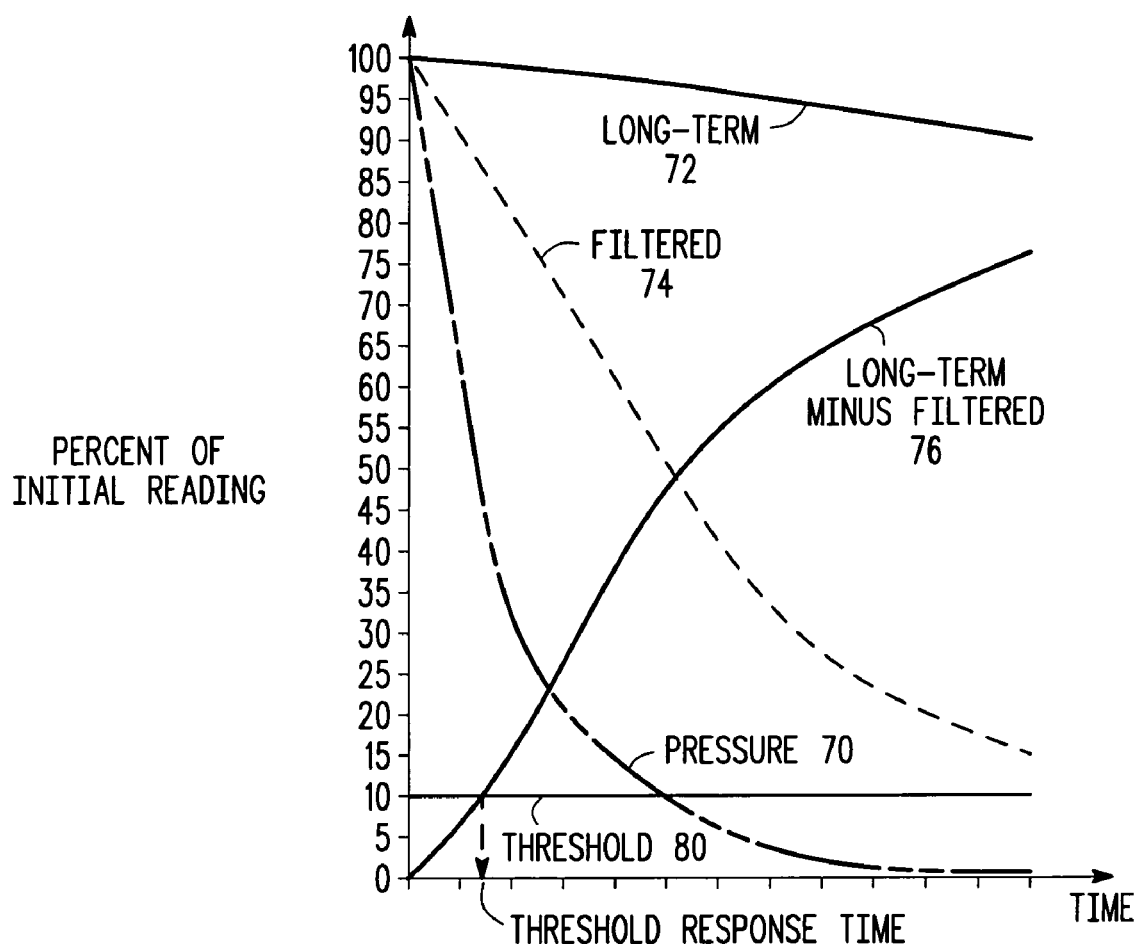
FIG. 4 is a graph of operational data using running average filtering.

To better understand the filtered change curve of step 40 and the long-term change curve of step 42, refer to FIG. 4. The graph of FIG. 4 is a plot of the change, from 100 percent to 0, of an initial reading of pressure 70 with respect to time. Assume solely for purposes of discussion that the sensed tire pressure decays over time as shown. The running filters calculate a long-term change curve 72 by filtering out short term variations in pressure with respect to time by using a running average filter with small value of N of Eqn. 3 and keeping a long-term value with respect to time by using a running average filter with large values of N. A filtered change curve 74 represents the short-term variations or changes in pressure that has noise filtered out, and the long-term change curve 72 represents a baseline pressure to use for pressure change analysis. In this manner a specific pressure level is not required to be programmed or maintained within the wheel module 11 for a variety of tire types and recommended inflation levels. In the FIG. 4 illustration, the difference between the two curves increases with respect to time as illustrated by the long-term minus filtered curve 76. In the FIG. 4 example, a threshold 80 can be established which is used by decision step 46 and decision step 48. The threshold percentage or amount may be of any relatively small value, such as ten percent, fifteen percent, twenty percent, etc. Similarly the current value of the P/T ratio will have an averaged effect since it uses the pressure filtered curve data and can have a long-term change curve using another running average filter with a large value for N. Decision step 50 uses the sensed pressure and temperature and resulting ratio and long-term change curve 72 to determine whether an air leak exists or whether the vehicle is only cooling down and that decision will determine whether power management circuitry 14 increases or decreases the measure rates (i.e. whether wheel module 11 enters a low power battery mode or a normal power battery mode).

The sensitivity of detecting motion can be adjusted by changing the values of the variable N used in the filtered change 74 and long-term change 72 curves and by changing the threshold value 80 of the difference between the two curves that is used for decision making.

Therefore, motion sensing may be obtained without the use of a motion sensing switch. Further, the use of running average filters uses existing readings without adding additional data measurements which may consume power. Although battery power is saved by changing the measurement and transmission intervals between when the vehicle is moving and when it is parked, no battery power is expended by having to power a motion sensing device.

An additional benefit to the inferred motion sensing method taught herein relates to identifying whether a low inflated tire is a spare or is a road tire in place on the subject vehicle. When a road tire becomes under-inflated and is exchanged for the spare tire, the under-inflated tire could continue to cause a warning device to be activated by the information processing circuitry 28 even when it is stowed within the vehicle if motion sensing was not utilized as part of the criteria associated with the tire sensing. Many systems utilize a single warning lamp for the driver so an alarm condition would exist until the spare was serviced. However, with motion sensing capability existing in tire sensing system 10, the wheel module 11 can send, in addition to any other data, that the wheel module 11 has determined that it is or is not in motion by use of a flag bit. This flag bit state can be used by the information processing circuitry 28 to determine that no motion was occurring from the tire in which an air leak existed and to disable an alarm condition. Because the lack of motion can be detected with the method described herein, a faulty spare can be distinguished from faulty tires in road service on a vehicle.

By now it should be apparent that there has been provided a tire sensing system having power management by inferring motion sensing for the purpose of reducing battery consumption by changing the operational intervals. The inferred motion method is based on pressure rise with motion, extending the measurement intervals and using a running average leak detection method to signal faster measurement intervals when needed.

Various changes and modifications to the embodiments herein chosen for purposes of illustration will readily occur to those skilled in the art.

For example, a unique tire identifier may be transmitted by the RF transmitter so that each tire position may have a display result. Various types of batteries may be used depending upon the desired life and features of the tire pressure sensor. The process controller 22 may be implemented by a state machine, a microcontroller, logic circuitry or a combination of the above. Process controller 22 may be under RF or program control so that the monitoring of tire pressure does not begin until receipt of a predetermined signal or command instruction. Various physical implementations and placement of the wheel module 11 within a tire may be implemented. Wheel module 11 may be implemented in a pneumatic tire for use on any type of vehicle and the term "air" is defined to be any type of gas or gas composition. To the extent that such modifications and variations do not depart from the spirit of the invention, they are intended to be included within the scope thereof that is assessed only by a fair interpretation of the following claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The invention claimed is:

1. A method for power management in a tire pressure monitoring system for indicating when air pressure in a tire is below a predetermined amount, comprising:
   sensing the air pressure with a pressure sensor;
   sensing air temperature with a temperature sensor;
   determining whether the air pressure is increasing or decreasing with respect to time;
   determining whether a ratio of the air pressure and the air temperature is increasing, decreasing or remaining constant with respect to time to infer that the tire is moving, motion of the tire being determined without directly sensing acceleration or movement of the tire; and
   performing the sensing of air pressure and sensing of air temperature at measurement intervals which are longer in time than when the tire is in motion to save power in the tire pressure monitoring system when the tire is not in motion.

2. The method of claim 1 further comprising:
   inferring that the tire is moving when the air pressure is increasing with respect to time and the ratio of the air pressure and the air temperature remains -substantially constant with respect to time.

3. The method of claim 1 further comprising:
   deciding by inference that the tire is not moving when the air pressure is decreasing with respect to time and the ratio of the air pressure and the air temperature remains substantially constant; and
   performing the sensing of air pressure and sensing of air temperature at measurement intervals which are longer in time than when the tire is in motion to save power.

4. The method of claim 1 further comprising:
   modifying duration of the measurement intervals based upon comparison of a long term average of change in tire pressure with a filtered average of change in tire pressure by using one or more running average filters.

5. The method of claim 4 further comprising:
   implementing the one or more running average filters with computer executable instructions.

6. A tire air pressure monitoring system in a tire, comprising:
   a battery for powering the tire pressure monitoring system;
   a pressure sensor for sensing air pressure in the tire;
   a temperature sensor for sensing air temperature in the tire;
   control circuitry for determining whether the air pressure is increasing or decreasing with respect to time and determining whether a ratio of the air pressure and the air temperature is increasing, decreasing or remaining constant with respect to time to infer that the tire is moving, motion of the tire being determined without directly sensing acceleration or movement of the tire; and
   power management circuitry coupled to the battery, the pressure sensor and the temperature sensor for selectively powering the pressure sensor and temperature sensor at measurement intervals which are shorter when the control circuitry has inferred that the tire is moving than when the tire is not moving.

7. The tire air pressure monitoring system of claim 6 wherein the control circuitry infers that the tire is moving when the air pressure is increasing with respect to time and the ratio of the air pressure and the air temperature remains substantially constant with respect to time.

8. The tire air pressure monitoring system of claim 6 wherein the control circuitry determines that the tire is not moving when the air pressure is decreasing with respect to time and the ratio of the air pressure and the air temperature remains substantially constant, and the power management circuitry powers the air pressure sensor and the temperature sensor at measurement intervals which are longer in time than when the tire is in motion to save power.

9. The tire pressure monitoring system of claim 6 wherein the control circuitry controls the power management circuitry to modify powering duration of the measurement intervals based upon comparison of a long term average of change in tire pressure with a filtered average of change in tire pressure by using one or more running average filters.

10. The tire pressure monitoring system of claim 9 wherein the control circuitry further comprises a processor having a memory for storing software code that implements the one or more running average filters.

11. The tire pressure monitoring system of claim 9 wherein the control circuitry further comprises a state machine having logic code for implementing the one or more running average filters.

12. The tire pressure monitoring system of claim 6 further comprising:
   a transmitter coupled to the control circuitry for transmitting an alarm signal provided by the control circuitry in response to detection of low tire pressure;
   a receiver located outside of the tire for receiving the alarm signal;
   processing circuitry coupled to the receiver and located outside of the tire, the processing circuitry buffering the alarm signal; and
   a display coupled to the processing circuitry for providing a visual or audible indication of activation of the alarm signal.

13. An air pressure monitoring system for a tire, comprising:
   a pressure sensor for sensing air pressure in the tire;
   a temperature sensor for sensing air temperature in the tire;
   a control circuit having a first input for receiving a value representative of air pressure in the tire, and a second input for receiving a value representative of air temperature in the tire, the control circuit determining whether the air pressure is increasing or decreasing with respect to time and determining whether a ratio of the air pressure and the air temperature is increasing, decreasing or remaining constant with respect to time to infer that the tire is moving, motion of the tire being determined without directly sensing acceleration or movement of the tire; and power management circuitry coupled to the control circuit, the power management circuitry selectively providing power at measurement intervals which are shorter when the control circuit has inferred that the tire is moving than when the tire is not moving.

14. The air pressure monitoring system of claim 13 further comprising:

a transmitter coupled to the control circuit for transmitting an alarm signal provided by the control circuit in response to detection of low tire pressure;

a receiver located outside of the tire for receiving the alarm signal;

processing circuitry coupled to the receiver and located outside of the tire, the processing circuitry buffering the alarm signal; and an indicator coupled to the processing circuitry for providing a visual or audible indication of activation of the alarm signal.

15. The air pressure monitoring system of claim 14 wherein the transmitter also transmits a signal indicating whether the tire is in motion and the processing circuitry selectively disables the alarm signal from being indicated.

16. The air pressure monitoring system of claim 13 wherein the control circuit modifies duration of the measurement intervals based upon comparison of a long term average of change in tire pressure with a filtered average of change in tire pressure by using one or more running average filters.

17. The air pressure monitoring system of claim 16 wherein the control circuit further comprises a state machine having logic code for implementing the one or more running average filters.

18. The air pressure monitoring system of claim 16 wherein the control circuit further comprises a processor having a memory for storing software code that implements the one or more running average filters.

19. The air pressure monitoring system of claim 13 wherein the control circuit controls the power management circuitry to modify powering duration of the measurement intervals based upon comparison of a long term average of change in tire pressure with a filtered average of change in tire pressure.

20. The air pressure monitoring system of claim 13 further comprising:

a battery coupled to the control circuit and the power management circuitry to power the air pressure monitoring system.

* * * * *

UNITED STATES PATENT AND TRADEMARK OFFICE
CERTIFICATE OF CORRECTION

PATENT NO. : 7,242,285 B2  
APPLICATION NO. : 10/533271  
DATED : February 12, 2003  
INVENTOR(S) : Mark L. Shaw Page 1 of 1

It is certified that error appears in the above-identified patent and that said Letters Patent is hereby corrected as shown below:

On the Title Page, Item (30), Left column, Insert --The Domestic Priority Data as Claimed by Applicant:

This application is a 371 of PCT/US03/07219  
    02/12/2003 which claims benefit of 60/419,487  
    10/18/2002--

In Column 9, Line 41, Claim No. 2:  
    Change "temperature remains-substantially" to --temperature remains substantially--

Signed and Sealed this

Seventeenth Day of June, 2008

JON W. DUDAS  
*Director of the United States Patent and Trademark Office*

UNITED STATES PATENT AND TRADEMARK OFFICE
CERTIFICATE OF CORRECTION

PATENT NO. : 7,242,285 B2  Page 1 of 1
APPLICATION NO. : 10/533271
DATED : July 10, 2007
INVENTOR(S) : Mark L. Shaw It is certified that error appears in the above-identified patent and that said Letters Patent is hereby corrected as shown below:

On the Title Page, Item (30), Left column, Insert --The Domestic Priority Data as Claimed by Applicant:

This application is a 371 of PCT/US03/07219
    02/12/2003 which claims benefit of 60/419,487
    10/18/2002--

In Column 9, Line 41, Claim No. 2:
    Change "temperature remains-substantially" to --temperature remains substantially--

This certificate supersedes the Certificate of Correction issued June 17, 2008.

Signed and Sealed this

Twenty-second Day of July, 2008

JON W. DUDAS
*Director of the United States Patent and Trademark Office*